United States Patent Office 3,330,602
Patented July 11, 1967

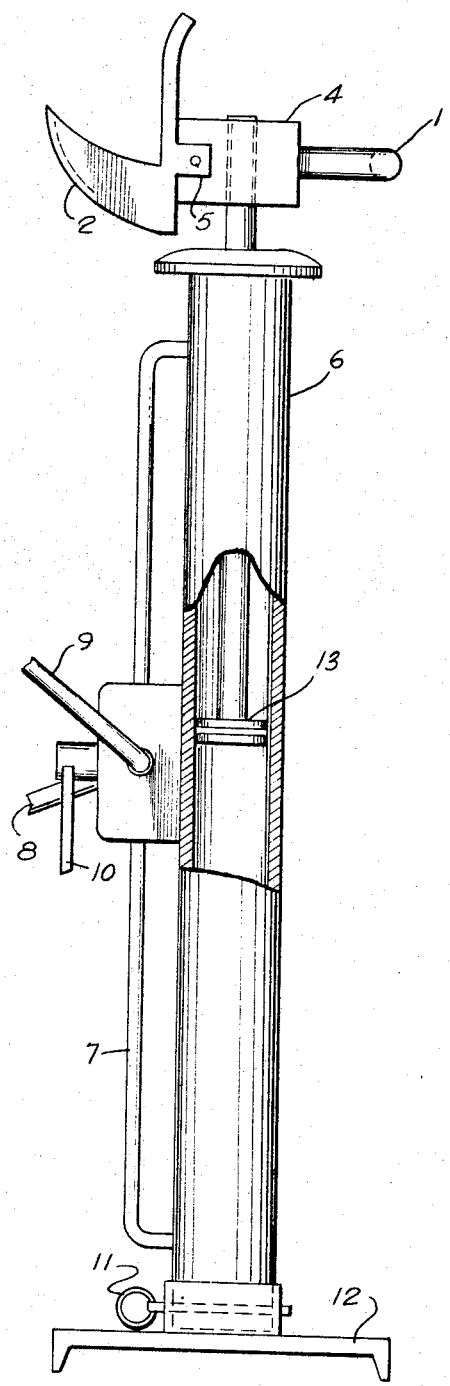
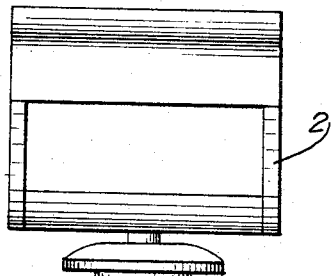
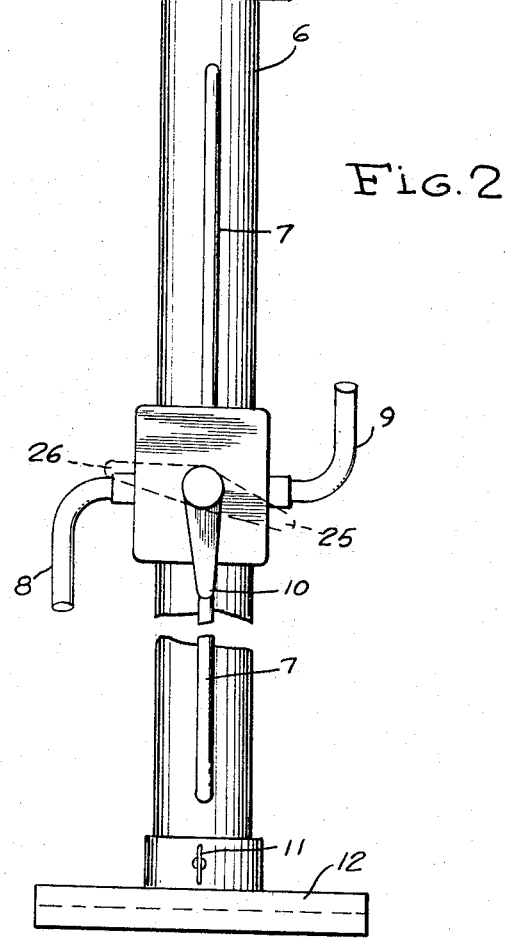

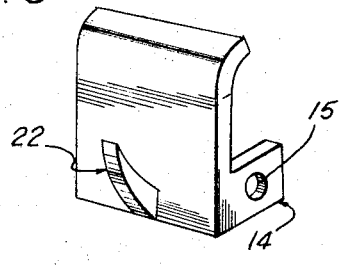
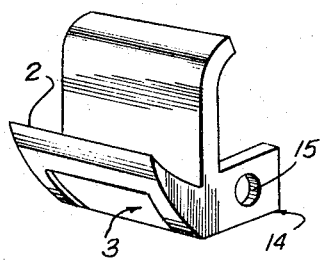
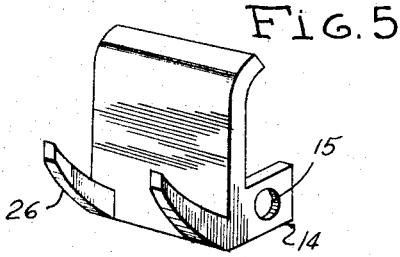
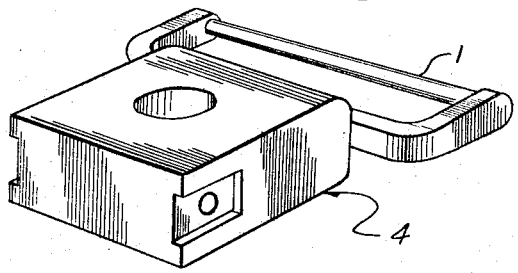
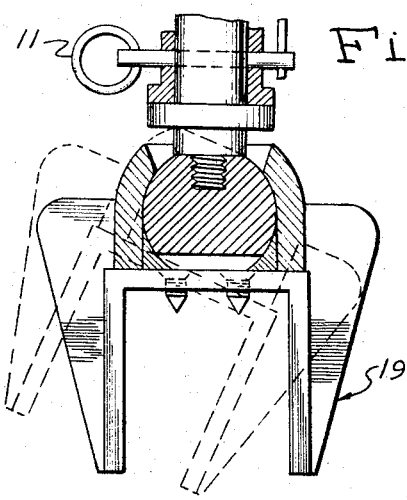
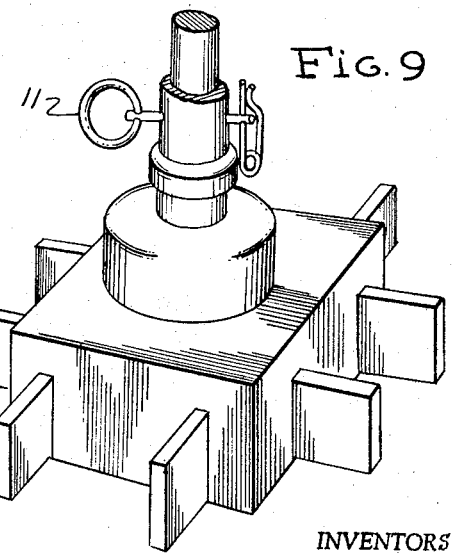
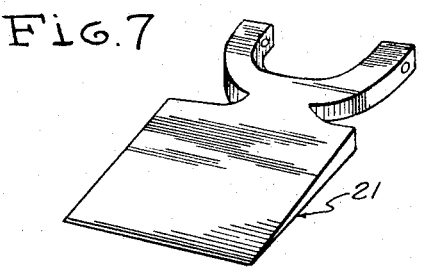

3,330,602
HAND-MANIPULATED, HYDRAULIC DIGGING TOOL
George R. Riley, Grove City, and Thomas M. Trainer, Columbus, Ohio, assignors to the United States of America as represented by the Secretary of the Army
Filed Oct. 14, 1965, Ser. No. 496,199
9 Claims. (Cl. 299—34)

This invention relates in general to digging devices and more particularly to hand-operated, hydraulic-driven, digging devices for use in small areas.

It is an object of this invention to provide a compact, powerful, hand-digging tool that has a great deal of flexibility and is portable within the limits of a hydraulic power supply.

It is a further object of this invention to provide a hand-digging tool equipped with quickly interchangeable blades and bases to provide greater flexibility.

It is still another object of this invention to provide a tool which is capable of simple operation in small, cramped areas.

It is still a further object of this invention to provide a tool for digging tunnels or for digging through drifts in military operations.

Other objects and a fuller understanding of the invention may be had by referring to the following description and claims taken in conjunction with the accompanying drawings, in which:

FIG. 1 is a side elevation of this invention;

FIG. 2 is a front view of this invention;

FIG. 3 is a grooving type blade for use with this invention;

FIG. 4 is a spaced scraper bar blade for undercutting and shearing soil;

FIG. 5 is a dual edged blade for loosening dirt between the edges;

FIG. 6 is a head and spade handle combination to which the various blades are attached;

FIG. 7 is a wedge type blade for use in removing dirt from a tunnel face;

FIG. 8 is a quick-disconnect base for use with the subject invention; and

FIG. 9 is another quick-disconnect base for use with the subject invention.

With reference to FIG. 1, this invention consists primarily of a hydraulic piston-cylinder combination 6, a head 4, a handle 1, a blade 2 connected by pin 5 to the head 4, and a base 12 connected to the piston-cylinder combination 6 by pin 11. Oil lines 8 and 9 connect to a source of high pressure hydraulic fluid at a pressure, for example, of 1000 p.s.i. The control valve 10 is 3-positional as shown in FIG. 2. With the valve in its vertical position, the spade unit is inoperative. When the valve is moved to position 25, high-pressure line 9 is opened and the high-pressure fluid flows to the space below piston 13. This, in turn, forces the piston upwardly and the blade 2 will disgorge dirt from the wall of the excavation being worked. The hydraulic fluid which was above piston 13 is meanwhile returned to a sump through conduit 7 and sump-line 8. When the piston 13 reaches the top of its stroke, the operator will then move the valve 10 to position 26 which lets the high pressure hydraulic fluid enter above the piston 13 and drive it downwardly. The fluid below the piston is returned to the sump in the same manner as before described. The hydraulic spade can then be returned to its starting position by the operator turning control valve 10 to its vertical position.

This invention is equipped with several easily mounted and dismounted blades, as illustrated in FIGS. 3, 4, 5, and 7, to provide flexibility in digging operations. Blades 22 or 26 would be used to cut grooves in hard material, which can then easily be removed by using blade 21 or a conventional shovel. Blade 2 can be used to remove large amounts of material which is fairly soft or loose. Blade 21 is used to either remove dirt loosened by using blades 22 or 26; to penetrate especially hard areas, such as rock beds, before using the other blades; or for removing dirt by the wedging action caused by forcing the blade into the soil at various angles. Many other types of blades which are capable of being quickly connected or disconnected could be used to provide an even more flexible tool.

To excavate a tunnel, the subject invention would be used essentially as follows:

The operator would first attach one of the blades, by inserting pin 5 through holes 15 in fingers 14 of the blade and then through the head 4. With the blade attached, and with an appropriate base, the operator would then alternately move control valve 10 to positions 25, 26 and back to its vertical position while pressing the blade against the excavation face by pressure on handle 1. This operation will cause the blade to penetrate the tunnel face and to remove an amount of dirt which is dependent on the type of blade used, and on the material being worked. The operator would then pull pin 5, if desired, and replace it with a second blade to perform any other needed operation. The second operation would be accomplished by once again moving the valve 10 through its three positions.

This invention is also equipped with quick-disconnect bases as shown in FIGS. 1, 8, and 9. The base shown in FIG. 1 would be used in normal operations, while that of FIG. 9 would be used where hard surface flooring is available and the tool is required to be especially stable. The base shown in FIG. 8 could be mounted on the support beams of a tunnel or, if the floor were especially mushy, soggy or wet, a plank could be thrown down and the channel joint 19 set over this plank to provide the needed support. All three of these bases could contain the universal-type mounting shown in FIG. 8 to provide greater maneuverability. The bases are all attached by inserting pin 11 through the holes in the piston-cylinder combination.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinatfer claimed.

We claim:

1. A hydraulic, hand-manipulated digging tool comprising:
    (a) a hydraulically-powered piston-cylinder unit;
    (b) a head rigidly mounted on the piston of said piston-cylinder unit and movable longitudinally, with respect to the cylinder of said piston-cylinder unit, in response to the movement of said piston;
    (c) a handle rigidly secured to said head;
    (d) a three-positional control valve mounted on said piston-cylinder unit, said three positions corresponding respectively to an upward thrust of said piston, a downward movement of said piston, and a neutral position;
    (e) a dirt removal cutting blade member releasably attached to said head by a pin, and;
    (f) a base releasably attached to said piston-cylinder unit by a pin.

2. The device of claim 1 wherein the head comprises:
    (a) a right-handed parallelepiped member having a groove on each face of one set of opposite side portions thereof, said grooves extending to one face of the other set of side portions of said member, a hole extending from the top to the bottom face of said member, and a hole extending from the center of one of said grooves to the center of the other of said grooves.

3. The device of claim 1 wherein the dirt removal cutting blade member comprises:
(a) a generally rectangular face member;
(b) two fingers extending rearwardly, respectively, from the opposite vertical sides of said face member, each said finger having an opening therein into which a pin can be inserted, and;
(c) a grooving blade centered longitudinally on said face member and extending forwardly from the face, said grooving blade being of an essentially crescent shape.

4. The device of claim 1 wherein the dirt removal cutting blade member comprises:
(a) a generally rectangular face member;
(b) two fingers extending rearwardly, respectively, from the opposite vertical sides of said face member, each said finger having an opening therein into which a pin can be inserted, and;
(c) two crescent shaped grooving blades, each respectively abutting the lower end and opposite vertical side of said face member and extending forwardly from said face.

5. The device of claim 1 wherein the dirt removal cutting blade member comprises:
(a) a generally rectangular face member;
(b) two fingers extending rearwardly, respectively, from the opposite vertical sides of said face member, each said finger having an opening therein into which a pin can be inserted, and;
(c) a rectangular shearing blade connected to said face member by generally crescent shaped members extending from the two vertical sides of said blade to the two vertical sides of said face member.

6. The device of claim 1 wherein the dirt removal cutting blade member comprises:
(a) a neck;
(b) a generally U-shaped member attached to one end of said neck, and having an opening in the ends thereof furthest removed from said neck so that a pin could be inserted therethrough; and
(c) a generally rectangularly shaped cutting blade, having one longitudinal side thereof sharpened to form a cutting edge, and being rigidly attached to said neck at the other longitudinal side thereof, said blade being attached in such a manner that it is in the same plane as said U-shaped member.

7. The device of claim 1 wherein the base comprises:
(a) a right-angled parallelepiped member;
(b) legs attached to one horizontal face of said member and extending downwardly therefrom; and
(c) a cylindrical member attached to the center of the other horizontal face of said member, said cylindrical member having two holes in the portion thereof opposite said member, said holes being spaced 180° apart on said cylindrical member to receive a pin.

8. The device of claim 1 wherein the base comprises:
(a) a right-angled parallelepiped member, having two sets of parallel grooves in the bottom thereof, one set of grooves being parallel to one set of the side portions of said member and the other set parallel to the other side portions;
(b) second right-angled parallelepiped members inserted in said grooves of said first member, said second members being longer then the dimensions of the first member, said second members also being of such dimension that the bottom edge thereof is flush with the bottom edge of said first member, and said second members having grooves therein so that the intersecting second members will interlock; and
(c) a cylindrical member attached to the center of the upper side of said first member, said cylindrical member having two holes in the portion thereof opposite said first member, said holes being spaced 180° apart on said cylindrical member to receive a pin.

9. The device of claim 1 wherein the base comprises:
(a) a neck;
(b) a ball attached rigidly to one end of said neck;
(c) a generally channel shaped member rollably attached to said ball so that said ball and channel act as a ball and socket joint; and
(d) a cylindrical member rigidly attached to the other end of said neck, said cylindrical member having two holes in the portion thereof opposite said neck, said holes being spaced 180° apart on said cylindrical member to receive a pin.

References Cited
UNITED STATES PATENTS

| | | | |
|---|---|---|---|
| 54,833 | 5/1866 | Locke et al. | 299—94 X |
| 82,391 | 9/1868 | Donisthorpe | 299—29 |
| 1,488,518 | 4/1924 | Robbins | 299—69 |
| 2,556,357 | 6/1951 | Baldwin | 173—36 X |
| 2,908,482 | 10/1959 | Curtis et al. | 173—36 X |

ERNEST R. PURSER, *Primary Examiner.*